United States Patent
Aertsens (10) Patent No.: US 12,515,034 B1
(45) Date of Patent: Jan. 6, 2026

(54) METHOD, SYSTEM AND APPARATUS FOR GRADUAL ATTENUATION OF CONGENITAL PORTOSYSTEMIC SHUNTS

(71) Applicant: Vetosens, LLC, Ames, IA (US)

(72) Inventor: Adrien Aertsens, Ames, IA (US)

(73) Assignee: Vetosens, LLC, Ames, IA (US)

( * ) Notice: Subject to any disclaimer, the term of this patent is extended or adjusted under 35 U.S.C. 154(b) by 900 days.

(21) Appl. No.: 17/746,086

(22) Filed: May 17, 2022

Related U.S. Application Data (63) Continuation of application No. 17/330,900, filed on May 26, 2021, now abandoned.

(51) Int. Cl.
*A61M 39/28* (2006.01)
*A61M 27/00* (2006.01)

(52) U.S. Cl.
CPC .......... *A61M 39/28* (2013.01); *A61M 27/002* (2013.01); *A61M 2205/0216* (2013.01); *A61M 2205/0266* (2013.01); *A61M 2250/00* (2013.01)

(58) Field of Classification Search
CPC .. A61M 39/28; A61M 39/281; A61M 39/285; A61M 39/286; A61M 39/287; A61M 27/002; A61M 2205/0216; A61M 2205/0266; A61M 2250/00; A61B 17/083; A61B 17/10; A61B 17/12; A61B 17/122; A61B 17/128; A61B 17/1285; A61B 2017/12004; A61B 2017/12009; A61B 2017/12013
See application file for complete search history.

(56) References Cited

U.S. PATENT DOCUMENTS

| | | | | |
|---|---|---|---|---|
| 2007/0162060 A1* | 7/2007 | Wild | ................. | A61B 17/1227 606/157 |
| 2018/0344321 A1* | 12/2018 | Soutorine | ............ | A61B 17/128 |

OTHER PUBLICATIONS

Beal MW, Brown DC, Shofer FS. The effects of perioperative hypothermia and the duration of anesthesia on postoperative wound infection rate in clean wounds: a retrospective study. Vet Surg. 2000;29:123-127.
Berent AC, Tobias KM. Hepatic vascular anomalies. In: Tobias KM, Johnston SA, eds. Veterinary Surgery: Small Animal. St Louis, MO: Elsevier; 2012:1624-1658.
Bertolini G, Rolla EC, Zotti A, Caldin M. Three-dimensional multislice helical computed tomography techniques for canine extra-hepatic portosystemic shunt assessment. Vet Radiol Ultrasound. 2006;47:439-443.

(Continued)

*Primary Examiner* — Robert A Lynch
(74) *Attorney, Agent, or Firm* — Goodhue, Coleman & Owens, P.C.

(57) ABSTRACT

A system, apparatus, and method for the gradual attenuation of a shunt using an attenuation clip. The attenuation clip having a front end opposing a back end wherein the front end has a front opening configured to slide over a shunt, a first side having a first outer arm and a first inner arm and a second inner arm, wherein a proximal side of the first inner arm and a proximal side of the second inner arm are configured to rest on the shunt and a polymer holder connected to the first inner arm and the second inner arm holding a biodegradable polymer. As the biodegradable polymer degrades the shunt is sealed by the first arm and the second arm.

20 Claims, 11 Drawing Sheets

(56) References Cited

OTHER PUBLICATIONS

Besancon MF, Kyles AE, Griffey SM, et al. Evaluation of the characteristics of venous occlusion after placement of an ameroid constrictor in dogs. Vet Surg. 2004;33:597-605.

Eugster S, Schawalder P, Gaschen F, Boerlin P. A prospective study of postoperative surgical site infections in dogs and cats. Vet Surg. 2004;33:542-550.

Falls EL, Milovancev M, Hunt GB, Daniel L, Mehl ML, Schmiedt CW. Long-term outcome after surgical ameroid ring constrictor placement for treatment of single extrahepatic portosystemic shunts in dogs. Vet Surg. 2013;42:951-957.

Hunt GB, Culp WT, Mayhew KN, Mayhew P, Steffey MA, Zwingenberger A. Evaluation of in vivo behavior of ameroid constrictors in dogs with congenital extrahepatic portosystemic shunts using computed tomography. Vet Surg. 2014;43:834-842.

Hunt GB, Kummeling A, Tisdall PLC, et al. Outcomes of cellophane banding for congenital portosystemic shunts in 106 dogs and 5 cats. Vet Surg. 2004; 33:25-31.

Landon BP, Abraham LA, Charles JA. Use of transcolonic portal scintigraphy to evaluate efficacy of cellophane banding of congenital extrahepatic portosystemic shunts in 16 dogs. Aust Vet J. 2008;86:169-179.

Leeman JJ, Kim SE, Reese DJ, Risselada M, Ellison GW. Multiple congenital PSS in a dog: case report and literature review. J Am Anim Hosp Assoc. 2013;49:281-285.

Mehl ML, Kyles AE, Hardie EM, et al. Evaluation of ameroid ring constrictors for treatment of single extrahepatic portosystemic shunts in dogs: 168 cases (1995-2001). J Am Vet Med Assoc. 2005;226:2020-2030.

Nelson NC, Nelson LL. Imaging and clinical outcomes in 20 dogs treated with thin film banding for extrahepatic portosystemic shunts. Vet Surg. 2016;45:736-745.

Pechlivanis I, Konig M, Engelhardt M, et al. Evaluation of clip artifacts in three-dimensional computed tomography. Cent Eur Neurosurg. 2009;70:9-14.

Silverman PM, Spicer LD, Mckinney R, Feldman DB. Computed tomographic evaluation of surgical clip artifact: tissue phantom and experimental animal assessment. Comput Radiol. 1986;10:37-40.

Thompson EM, Towle Millard HA, Moore GE, Guptill L. In vitro effect of multiple hydrogen peroxide gas plasma sterilizations on the rate of closure of ameroid constrictors. Am J Vet Res. 2014;75:924-928.

Vogt JC, Krahwinkel DJ, Bright RM, Daniel GB, Toal RL, Rohrbach B. Gradual occlusion of extrahepatic portosystemic shunts in dogs and cats using the ameroid constrictor. Vet Surg. 1996;25:495-502.

Wallace et al., Gradual attenuation of a congenital extrahepatic portosystemic shunt with a self-retaining polyacrylic acid-silicone device in 6 dogs, Veterinary Surgery. 2018;47:722-728.

Wallace ML, Ellison GW, Batich C, Case JB, Kim SE. In vitro development and evaluation of a polyacrylic acid-silicone device intended for gradual occlusion of portosystemic shunts in dogs and cats. Am J Vet Res. 2016;77:315-322.

Wallace ML, Ellison GW, Giglio RF, et al. Assessment of the attenuation of an intra-abdominal vein by use of a siliconepolyacrylic acid gradual venous occlusion device in dogs and cats. Am J Vet Res. 2016;77:653-657.

Youmans KR, Hunt GB. Experimental evaluation of four methods of progressive venous attenuation in dogs. Vet Surg. 1999; 28:38-47.

* cited by examiner

METHOD, SYSTEM AND APPARATUS FOR GRADUAL ATTENUATION OF CONGENITAL PORTOSYSTEMIC SHUNTS

PRIORITY STATEMENT

This application is a continuation of U.S. application Ser. No. 17/330,900 filed on May 26, 2021, titled METHOD, SYSTEM AND APPARATUS FOR GRADUAL ATTENUATION OF CONGENITAL PORTOSYSTEMIC SHUNTS all of which are hereby incorporated by reference in their entireties.

FIELD OF THE INVENTION

The present invention relates to attenuation clips. More particularly, but not exclusively, the present invention relates to a method and apparatus for gradual attenuation of congenital portosystemic shunts.

BACKGROUND

A congenital portosystemic shunt (PSS) is an infrequent disorder in dogs or cats, with a prevalence of 0.02-0.6% in dogs. PSS affect liver's vascularization. Medical treatment is possible, but surgery has been shown to achieve better long-term outcome. Acute complete ligation of the shunt is rarely tolerated (14%), inducing life-threatening hypertension. Gradual occlusion over 4 to 6 weeks of the shunt is needed to avoid life-threatening hypertension. Two main techniques are currently used to achieve this goal: cellophane banding and ameroid constrictors. Both techniques rely on per-operative subjective selection of the implant's size needed, and closure of the shunt then depends mainly on the inflammation induced by the implant. Therefore, what is needed is a closure method, system, and apparatus that gradually attenuates the shunt using other mechanisms, such as hydrolysis.

SUMMARY

Therefore, it is a primary object, feature, or advantage of the present invention to improve over the state of the art.

It is a further object, feature, or advantage of the present invention to close shunts without relying on the body's inflammation.

It is a still further object, feature, or advantage of the present invention to use hydrolysis to close the shunt.

Another object, feature, or advantage is to provide a super elastic attenuation clip.

Yet another object, feature, or advantage is complete closure of the shunt.

Yet another object, feature, or advantage is using a biodegradable polymer to slowly close the shunt over time.

According to one aspect an attenuation clip for gradual attenuation of a shunt, includes a front end opposing a back end. The front end has a front opening configured to slide over a shunt. The attenuation clip includes a first side having a first outer arm and a first inner arm and an opposing second side having a second outer arm and a second inner arm. A proximal side of the first inner arm and a proximal side of the second inner arm are configured to rest on the shunt. The attenuation clip may further include a polymer holder connected to the first inner arm and the second inner arm wherein the polymer holder is configured to hold a polymer. The front end, back end, first arm, second arm and polymer holder are comprised of an elastic metal material.

In another aspect of the attenuation clip system, the system includes an attenuation clip having a first side opposing a second side. The first side and second side are spaced apart by a back end. The first side further comprises a first inner arm and a first outer arm and the second side further comprises a second inner arm and a second outer arm. The first inner arm and the second inner arm are configured to rest on a shunt. The attenuation clip system includes a polymer holder having a first end on a back end of the first inner arm opposing a second end on a back of the second inner arm. The polymer holder is configured to hold a biodegradable polymer. The attenuation clip system includes at least one insertion notch configured to connect to an insertion tool while the attenuation clip is placed over a shunt. The first arm, second arm, back end and polymer holder are comprised of super elastic metal. The super elastic metal is configured to deform a shape of the attenuation clip when the polymer is inserted. A biodegradable polymer rests in the polymer holder. The biodegradable polymer is configured to degrade if the biodegradable polymer is inserted into a body of a patient. The polymer holder decreases in size as the biodegradable polymer degrades. The first inner arm and second inner arm are configured to move towards each other as the biodegradable polymer degrades.

In another aspect, a method for gradual attenuation of a shunt using the attenuation clip system includes inserting a polymer into a polymer holder of an attenuation clip comprising super elastic metal, wherein the super elastic metal can be deformed and then recover permanently to a closed position. The method may further include inserting the attenuation clip using an insertion tool into a body of patient wherein the attenuation clip is placed over a shunt and wherein the super elastic property of the nitinol allows spreading the first arm of the attenuation clip and a second arm of the attenuation clip to place the clip around the shunt, before securing/apposing these arms to each other around the shunt by removing the insertion tool. The method also includes degrading the polymer using hydrolysis wherein the polymer holder decreases in size as the polymer degrades and wherein a first arm of the attenuation clip and a second arm of the attenuation clip move inward as the polymer degrades. The method further includes closing the shunt by the attenuation clip, wherein the first arm and the second arm of the attenuation clip press together.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION

A congenital portosystemic shunt (PSS) is an infrequent disorder in dogs or cats, with a prevalence of 0.02-0.6% in dogs. PSS affect liver's vascularization: The blood from the intestines, which normally goes through the liver to be filtered and metabolized, bypasses the liver through the shunt. This shunted blood gets mixed in the general vascularization, leading to abnormal systemic levels of toxins. The affected patients have neurologic, urologic, and digestive clinical signs.

Medical treatment is possible, but surgery has been shown to achieve better long-term outcome. Surgery is consequently considered the gold standard treatment, aiming at closing the shunt. Acute complete ligation of the shunt is rarely tolerated (14%), inducing life-threatening hypertension. Gradual occlusion of the shunt over 4 to 6 weeks has to be performed. Two main techniques are currently used to achieve this goal: cellophane banding and ameroid constrictors. Both techniques rely on per-operative subjective selection of the implant's size needed, and closure of the shunt then depends mainly on the inflammation induced by the implant. Consequently, rate of closure is non-linear and incomplete closure of the PSS is a common complication, which is exacerbated in cats or when the shunt is in the thorax. The application of the ameroid is technical and the ameroid's weight may induce acute hypertension by kinking the vessel if it moves.

Figure 1:
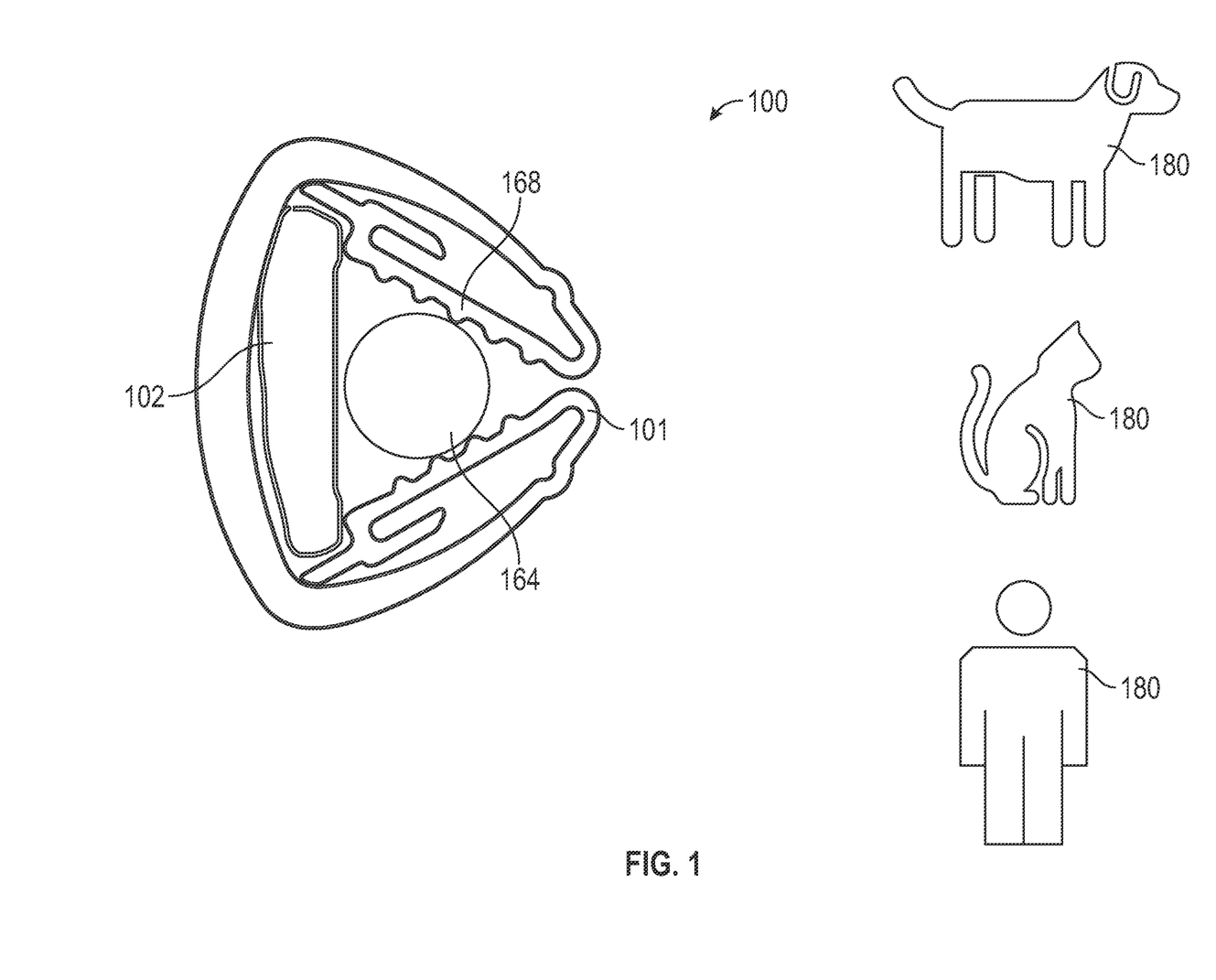
FIG. 1 is an exemplary illustration of the attenuation clip system.
Figure 6:
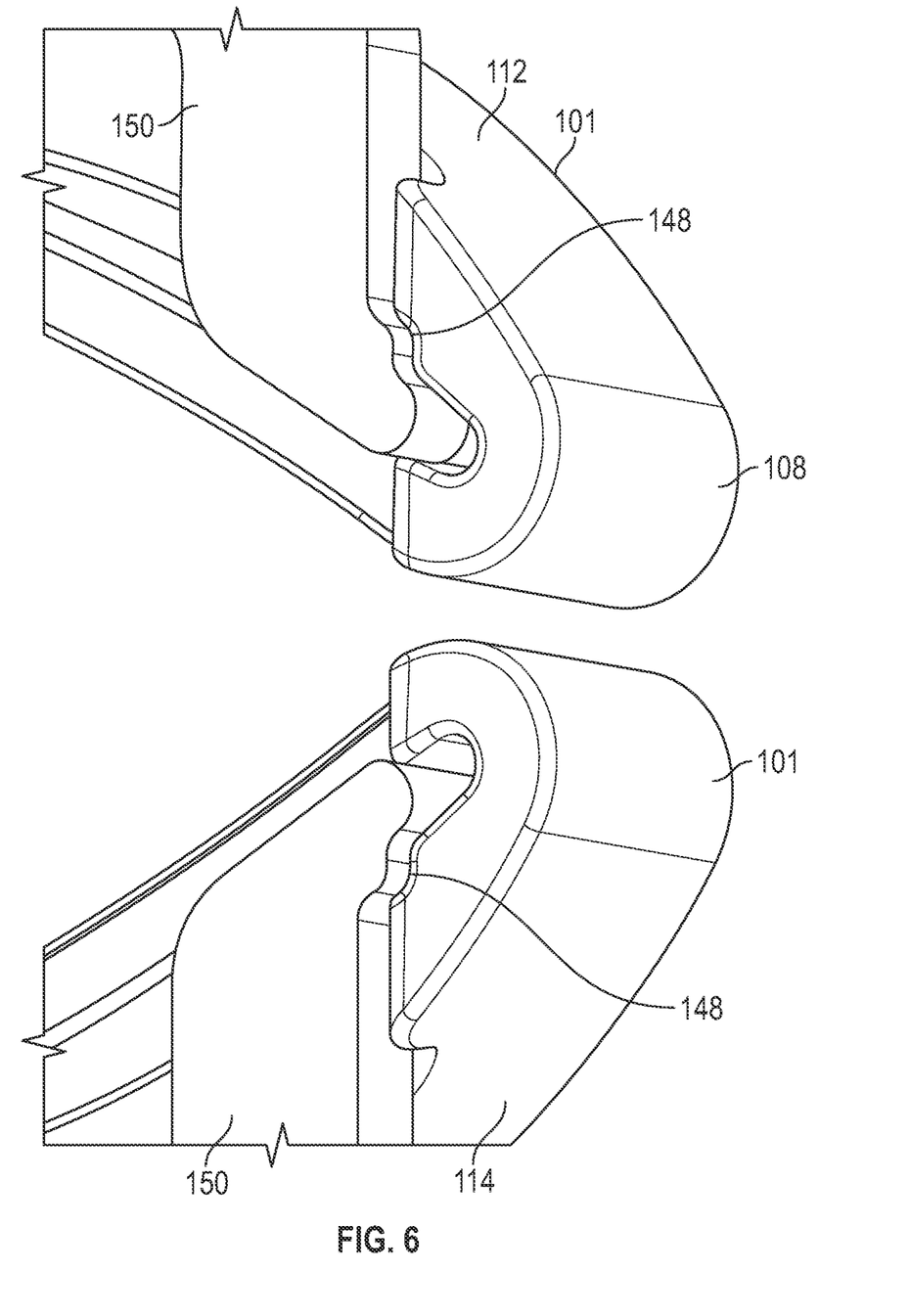
FIG. 6 is an exemplary illustration of the insertion tool connected to the attenuation clip.
Figure 7:
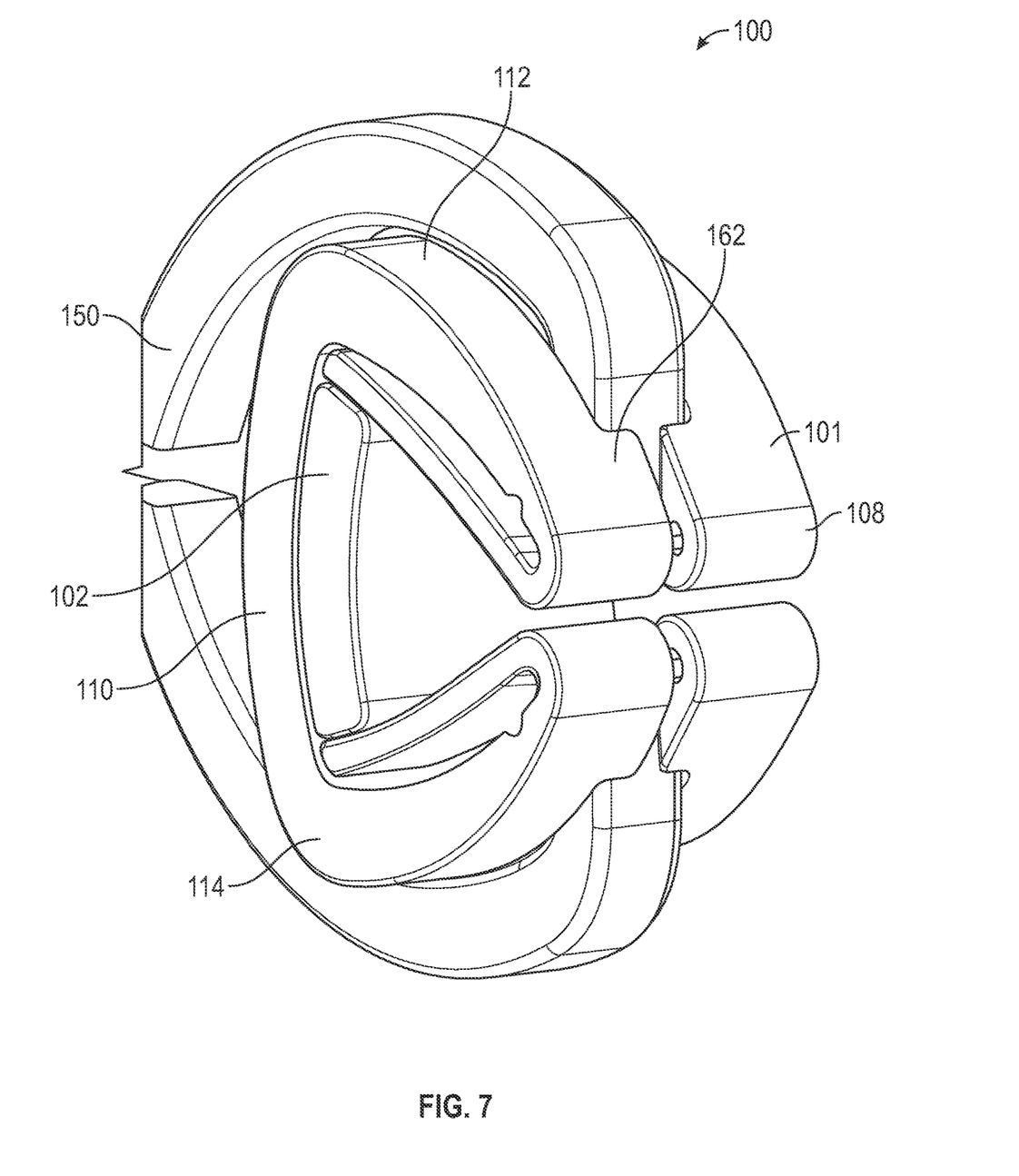
FIG. 7 is an additional exemplary illustration of the insertion tool connected to the attenuation clip.
Figure 8:
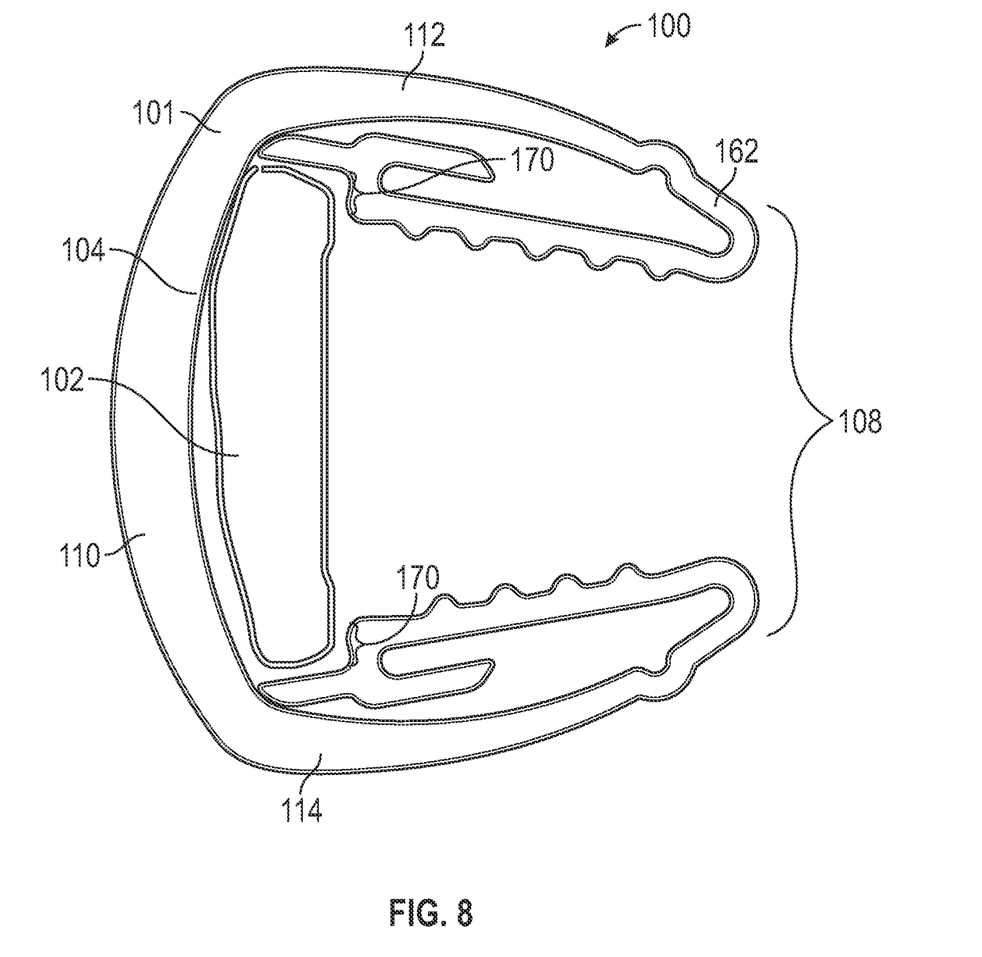
FIG. 8 is an exemplary illustration of the attenuation clip in the insertion position.

The Attenuation-clip (A-clip) system 100 achieves complete occlusion over 6 weeks, without relying on organism's inflammatory reaction, as shown in FIG. 1. Instead, the closure mechanism of a A-clip 101 of the attenuation clip system 100 relies on hydrolysis degrading a polymer 102 contained within in the A-clip 101. The A-clip's 101 size fits any shunts diameter, such as for example the A-clip 101 may be designed to fit a vessel up to 5 mm or the A-clip 101 can be designed to accommodate up to 10 mm or 15 mm vessels. The A-clip 101 is easy to apply and lighter than the ameroid, avoiding any risk of kinking the vessel. the A-clip 101 is applied using an insertion tool, as shown in FIGS. 6-8. Lastly, the A-clip may be implanted using laparoscopic approach.

The A-clip 101 may be made of materials that are biocompatible and super elasticity such as memory metals. These materials can include Nitinol, a nickel and titanium allow, copper aluminum nickel alloys, silver cadmium alloys, copper tin alloys, copper zinc alloys, copper zinc, silicon, tin aluminum alloys, indium titanium alloys, nickel aluminum alloys, iron platinum alloys, or magnesium copper alloys. Other metal alloys that may be used as material for the A-clip 101 may include iron magnesium silicon alloys, copper titanium allows such as Ni-free super elastic titanium alloys, aluminum alloys, silver alloys, copper alloys, Titanium Aluminum Vanadium alloys, magnesium alloys, zinc alloys, zinc magnesium alloys, tantalum, chromium alloys, cobalt alloys, molybdenum alloys, Cobalt Chromium molybdenum alloys, platinum alloys, palladium alloys, iron alloys, or amorphous alloys. After an appropriate heat treatment, super elastic Nitinol may accommodate strain without significant permanent deformation at room temperature.

In one example the A-clip 101 is made of a super elastic metal such as nitinol which remains super elastic at room temperature and body temperature. The super elastic metal can be deformed, such as an open position or a loading position and then recover permanently to a closed position. A Nitinol alloy has shape forming memory property. The biocompatibility of the material allows the A-clip 101 to perform occlusion without eliciting an undesirable local or systemic effect, such as an excessive inflammatory response, from the body the clip is inserted into, instead the A-clip 101 is accepted by the body. Other functional characteristics that are important for metallic device include adequate mechanical properties such as strength, stiffness, and fatigue properties; and also appropriate density.

The metal material of the A-clip 101 may be able to change from one shape to another in response to temperature changes or physiological conditions. A one-way memory metal alloy can be deformed and then recover permanently to its original shape when heated to a certain temperature. A two-way memory metal alloy holds the original shape at a first temperature and takes on a different shape or is deformable at a second temperature.

In some aspects, under higher temperatures, such as the internal body temperature of the patient, the A-clip 100 material enters an austenite phase where the A-clip 101 becomes stiff a spring-like when bent out of the closed position 136, allowing for compression and eventual closure of the shunt 164. In some cases the increase of the body temperature from room temperature may make the A-clip stiffer and move a first proximal side 120 and the second proximal side 132 towards the vessel 164 and away from the outer arms 116, 128. In lower temperatures, such as room temperature, the A-clip 101 enters the martensitic phase where the material is easily deformable allowing the A-clip to be easily opened and inserted into a patient 180 during surgery.

Figure 3:
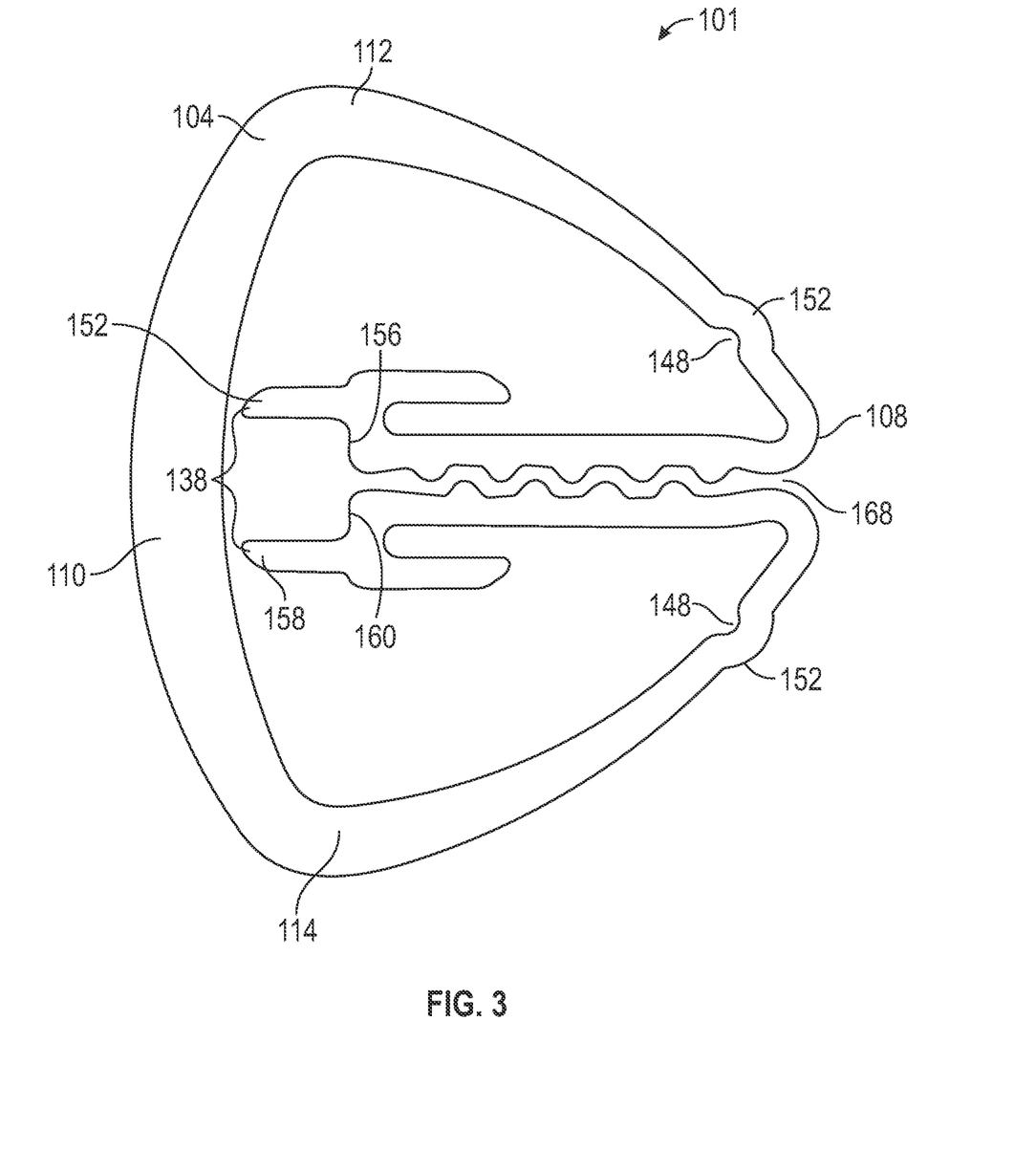
FIG. 3 is an exemplary illustration of a top view of the attenuation clip.
Figure 9:
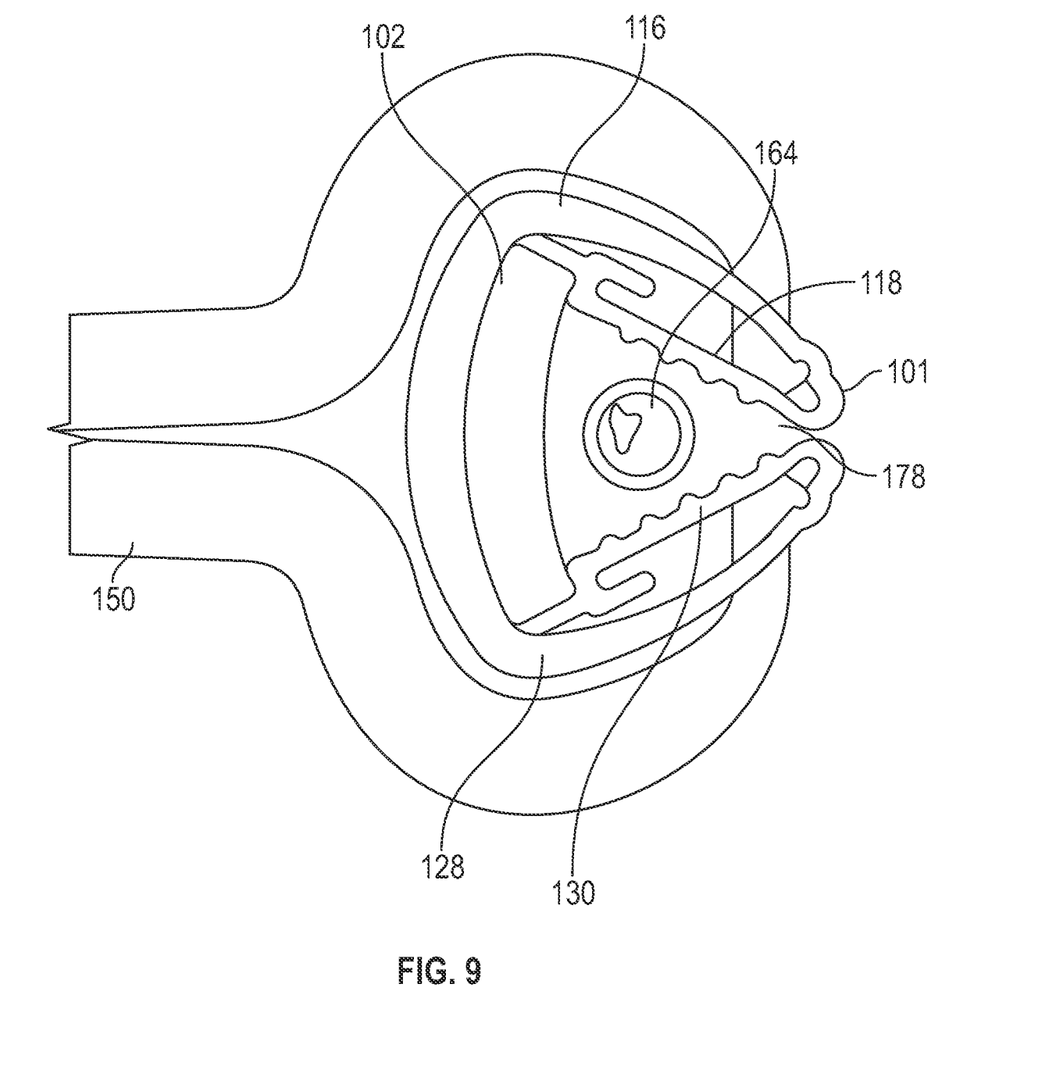
FIG. 9 is an exemplary illustration of the attenuation clip closed on a shunt.

The elasticity of the A-clip 101 allows for opening or closing the implant without permanently deforming it, as shown in FIG. 1, FIG. 3 and FIG. 9. To avoid acute or sudden and complete closure of the A-clip 101, a biodegradable polymer 102 keeps it open as shown in FIGS. 1 and 8-10 until the polymer 102 degrades. The biodegradable polymer 102 allows the A-clip 101 to close over few weeks by being gradually absorbed by the animal's body. As the polymer 102 degrades the A-clip springs back to the closed position 136 slowly due to the body temperature of the patient 180 and closes the shunt 164. Consequently, the A-clip 101 will achieve complete occlusion without relying on organism's inflammatory reaction but by the absorption of the polymer 102, which is more straightforward and predictable. The rate of closure could be easily changed by using a different polymer 102 if slower closure rate or faster closure rate is required or beneficial. The biodegradable polymer 102 may be non-toxic allowing the body to degrade the polymer 102 without an excessive or undesirable inflammatory response. The non-toxicity allows the polymer 102 to be eliminated from the body using natural metabolic pathways without additional medical or veterinary intervention. The biodegradable polymer 102 may be polylactic acid, poly (lactic-co-glycolic) acid, glycoside, polylactide, polyhydroxobutyrate, chitosan, hyaluronic acid, hydrogels, poly (2-hydroxyethyl-methacrylate), poly(ethylene glycol), chitosan, hyaluronic acid, or Max-Prene 955, linear block copolymer, 95% Glycolide-5% Lactide.

Figure 2:
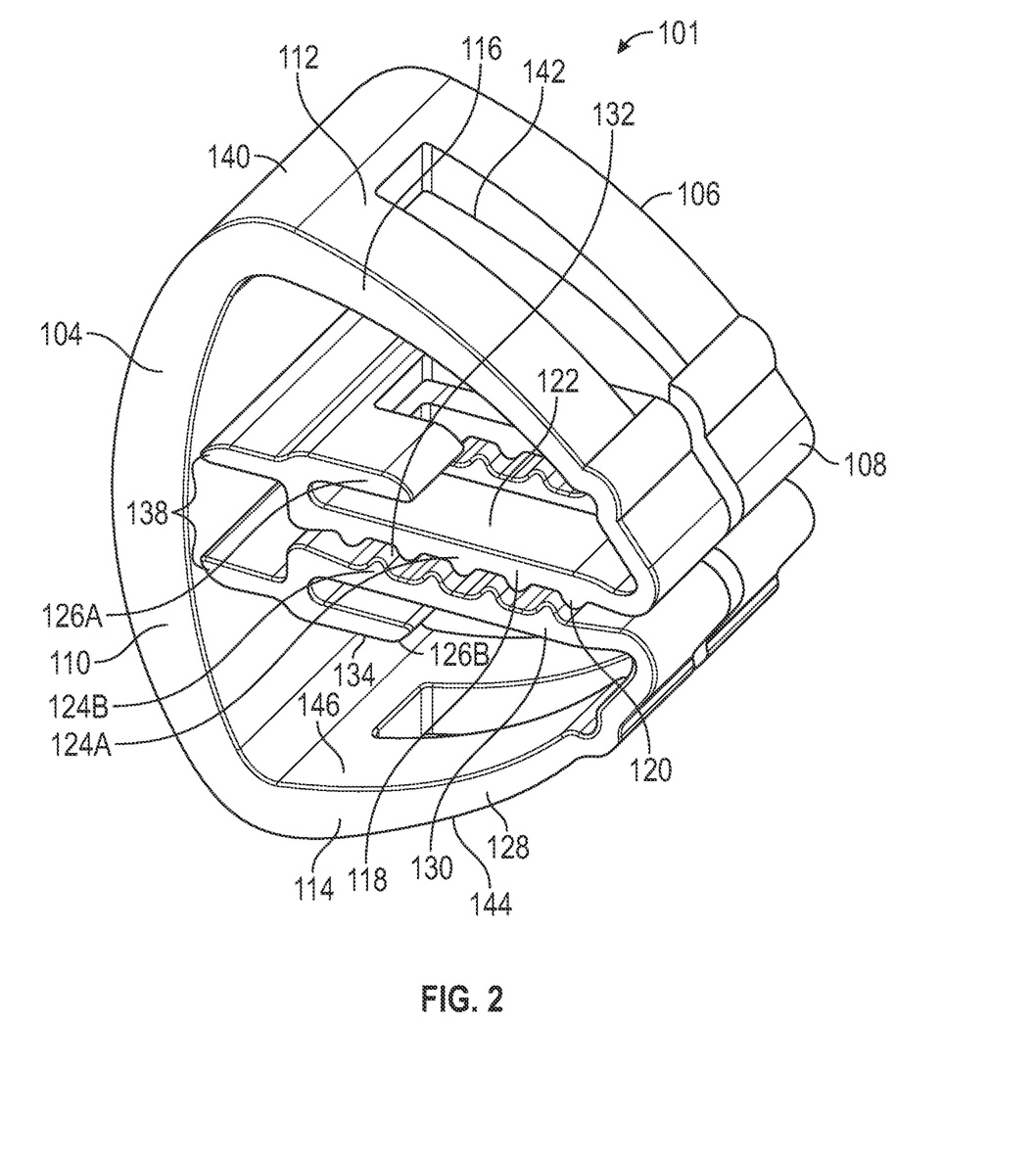
FIG. 2 is an exemplary illustration of a perspective view of the attenuation clip.

The A-clip 101 may be triangular in shape with rounded corners to prevent sharp edges from damaging the patient's 180 body during insertion and the closure process. The A-clip 101 has a top portion 104 opposing a bottom portion 106, a front end 108 opposing a back end 110, and a first side 112 opposing a second side 114 as shown in FIGS. 2 and 3. The top portion 104 and the back portion 106 may be symmetrical as well as the first side 112 and the second side 114. The back end 110 may curve and connects to both the first side 112 and second side 114. The first side may have a first outer arm 116 opposing a first inner arm 118. The first inner arm 118 has a first proximal side 120 and a first posterior side 122. The second side 114 has a second outer arm 128 and an opposing second inner arm 130. The second inner arm 130 opposes the first inner arm 118. The second inner arm has a second proximal side 132 and a second posterior side 134.

Figure 10:
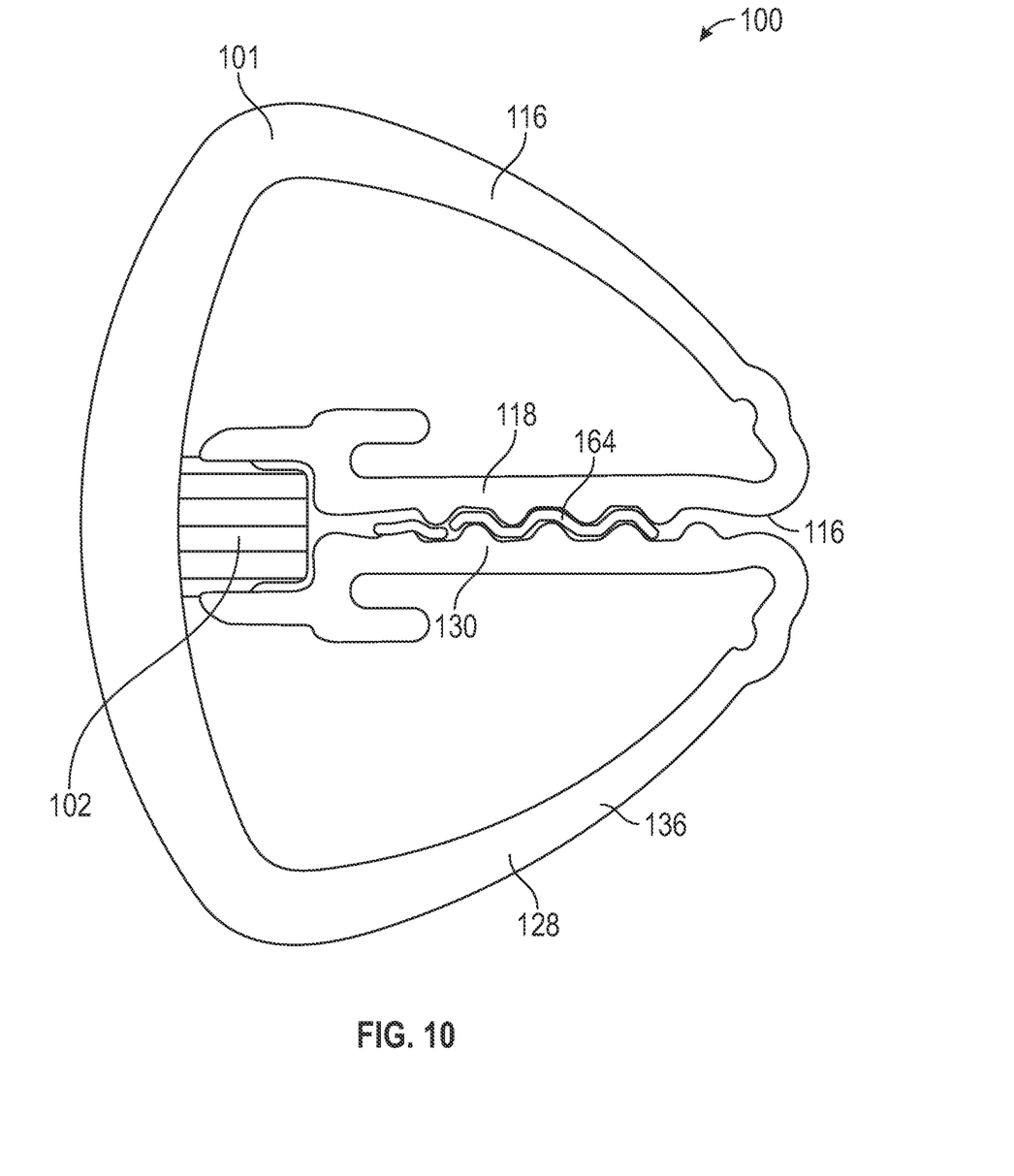
FIG. 10 is an exemplary illustration of the attenuation clip in the closed position.
Figure 11:
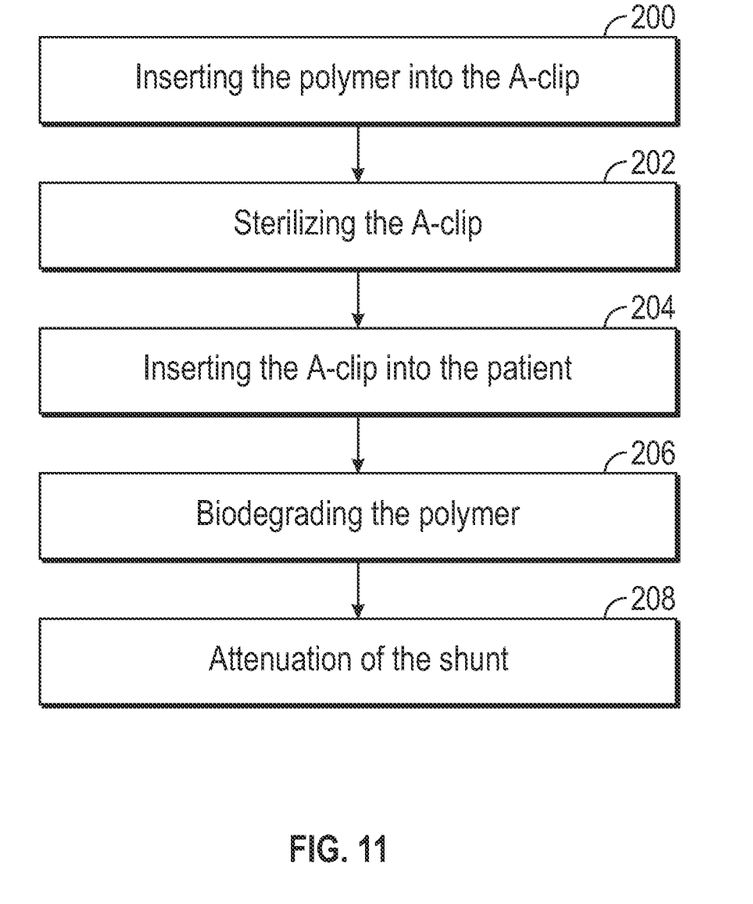
FIG. 11 is an exemplary flowchart of a method of the attenuation clips closure a of shunt.

The first proximal side 120 and the second proximal side 132 may have one or more protrusions 124 such as teeth 124A and 124B to prevent the shunt 164, vessel or tissue from slipping out of the A-clip 101 while in use as shown in FIG. 10. The protrusions 124 on the first proximal side of the first inner arm 120 may alternate with the protrusions 124 or teeth on the second proximal side of the second inner arm 132 as shown in FIG. 2. When in a closed position 136 the first inner arm 118 and the second inner arm 130 may be adjacent to each other without a gap 178 in FIG. 9 as shown in FIG. 10. The polymer prevents the inner arms 118 and 130 from quickly compressing the shunt 164. The first posterior side 122 and the second posterior side 134 may have a polymer notch 126A and 126B which allows the first inner arm 118 to be pulled closer to the first outer arm 116 and the second inner arm 130 to be pulled closer to the second outer arm 128, as shown in FIGS. 2, 8 and 9, when the polymer 102 is inserted into the A-clip 101. The polymer notch 126 may be u-shaped, hook shaped or any other shape that facilitates pulling the inner arms 118 towards the outer arms 116 allowing a polymer 102 to be placed in the polymer holder 138.

The polymer 102 is held or contained in the polymer holder 138. The polymer holder 138 has a first end 154 on a back end of the first inner arm 156 opposing a second end 158 on the back end of the second inner arm 160 as shown in FIGS. 1-4 and 6-11. The first end 154 and second end 158 of the polymer holder 138 may have a straight shape, a curved shape, a hook shape, a u-shape or any other shape that facilitates holding the biodegradable polymer 102. The polymer holder 138 is extendable and flexible adjusting to the size of the polymer 102 or the lack of a polymer. When the A-clip 101 is in an loading position 162, the first end of the polymer holder 154 can be adjacent to the first outer proximal side 142 and the back end 110 of the A-clip and the second end of the polymer holder 158 can be adjacent to the second outer proximal side 146 and the back end 110 of the A-clip as shown in FIG. 8. When the A-clip 101 is in the open position 166, the first end of the polymer holder 154 and the second end of the polymer holder 158 push together to hold the biodegradable polymer 102 or rest at the outer edges of the polymer 102 holding the polymer 102 in place as shown in FIG. 9. As the biodegradable polymer 102 degrades the first end of the polymer holder 154 and the second end of the polymer holder 158 move closer together bringing the first inner arm 118 and the second inner arm 130 closer together. As the polymer 102 slowly degrades, the vessel 164, tissue 164 or shunt 164 is slowly closed or sealed by compression of the first inner arm 118 and the second inner arm 130 as shown in FIG. 10. The protrusion 124 on the inner arms 118 and 130 prevent the vessel 164 or shunt 164 from slipping. The closure process may take multiple weeks, such as 6 to 8 weeks. In the closed position 136, the first end 154 and the second end 158 of the polymer holder 138 may be adjacent to each other or the first end and second end may have an offset 174 or small distance between the two ends. The polymer 102 may take longer to degrade then the aimed timing of the closure of the shunt 176, the offset 174 allows the polymer 102 to continue to degrade or be absorbed after closure 176 of the vessel 164, shunt 164, or tissue 164.

The first outer arm 116 has a first outer posterior side 140 and an opposing first outer proximal side 142. The second outer arm 128 has a second outer posterior side 144 and an opposing second outer proximal side 146. The first outer proximal side 142 and the second outer proximal side 146 have an insertion notch 148 configured to hold the insertion tool 150 while the A-clip is being inserted during surgery as shown in FIGS. 5-7 and 9. The insertion notch 148 may be closer to the front end 108 of the A-clip 101 than the back end 110. The first outer posterior side 140 and second outer posterior side 144 may have a ridge 152 where the insertion notch 148 is located on the respective proximal sides. In some aspects, the insertion notch 148 may be on the first outer posterior side 140 and the second outer posterior side 144.

Figure 4:
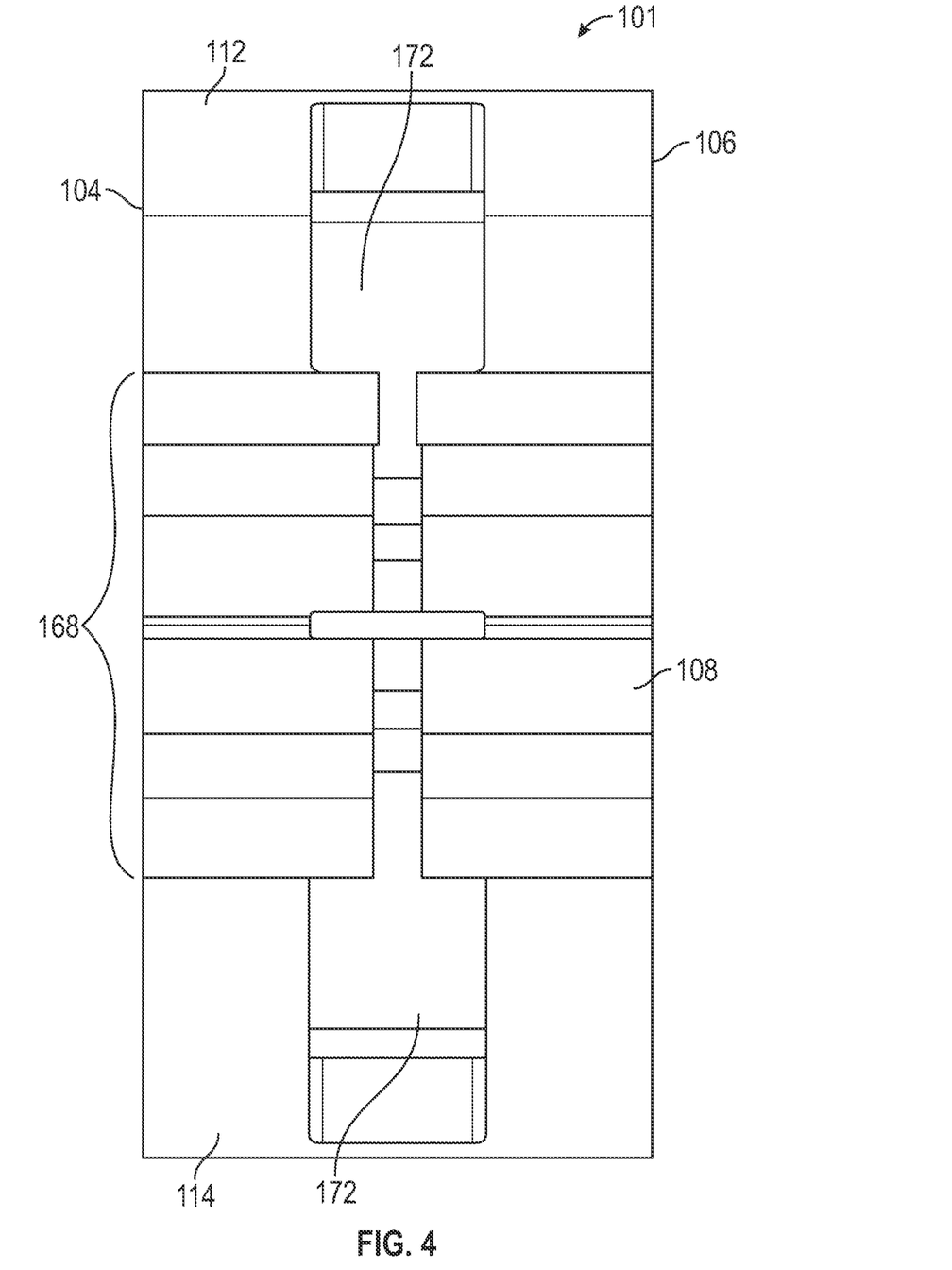
FIG. 4 is an exemplary illustration of a front view of the attenuation clip.
Figure 5:
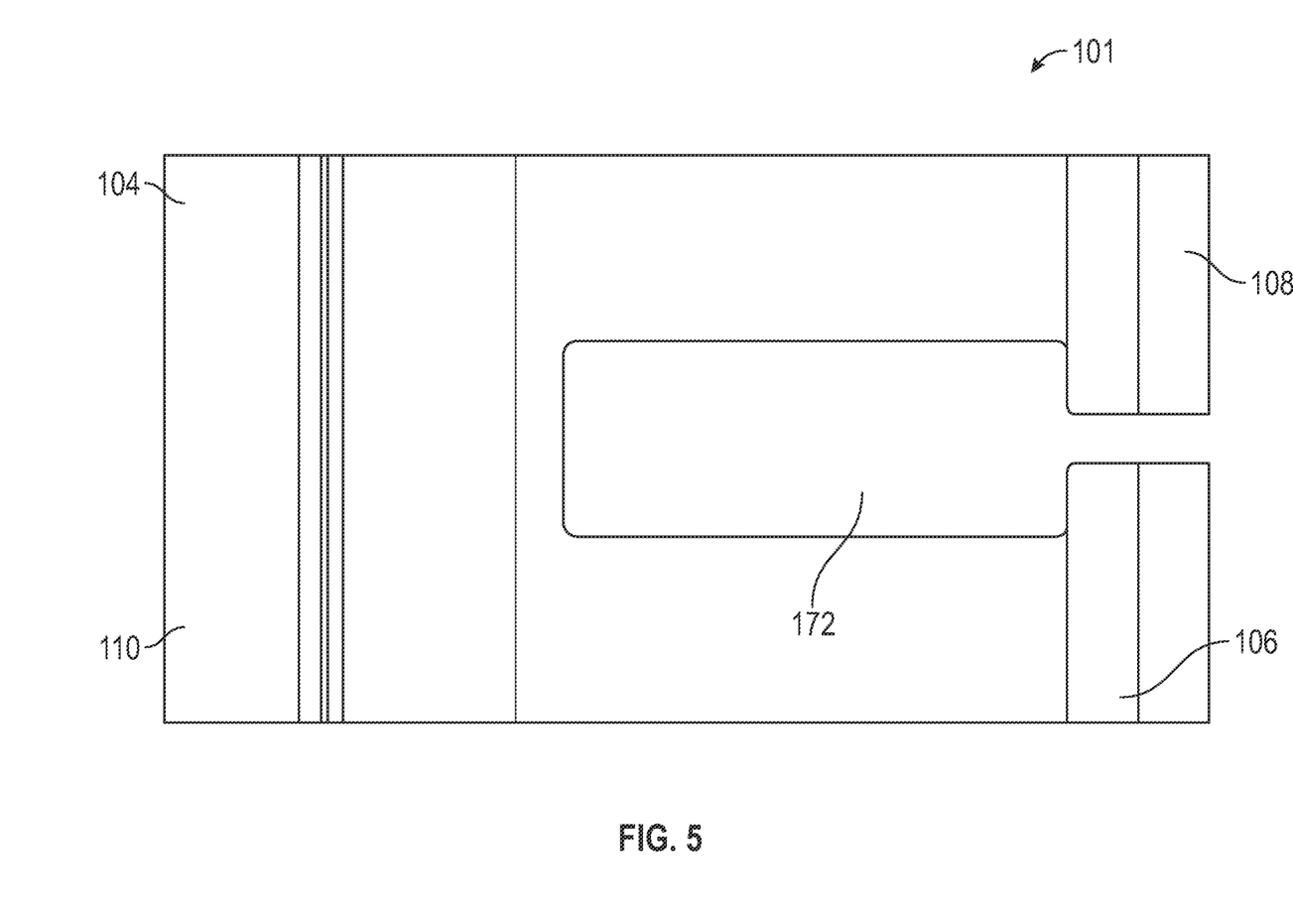
FIG. 5 is an exemplary illustration of a side view of the attenuation clip.

The front end 108 of the A-clip has an opening 168 allowing the first inner arm 118 and the second inner arm 130 to be secured on to the vessel 164, shunt 164 or tissue 164 as shown in FIG. 4. The insertion tool 150 uses the insertion notches 148 to open the A-clip 101 into the fully open position 166 which opens the front opening 168 and the A-clip 101 can slide onto the tissue 164, vessel 164 or shunt 164 and secure the A-clip 101 onto the vessel 164, tissue 164 or shunt 164. The front opening 168 may extend all the way to the polymer holder 138, as shown in FIG. 3. The first side 112, second side 114 and front end 108 of the A-clip 101 may have an insertion opening 172 to allow the insertion tool 150 to connection with the insertion notch 148 as shown in FIGS. 3, 4, and 5. The insertion opening 172 may extend from the front opening 168 to the polymer notch 126A of the first arm and the polymer notch 126B of the second arm. The insertion opening 172 may be on both the inner arms 118, 130 and the outer arms 116, 128 of the respective first side 112 and second side 114. The insertion opening height 172 on the front end 108 may be smaller than the insertion opening height 172 on the first side 112 and the second side 114 to prevent the insertion tool 150 from slipping out of the A-clip 101 during surgery. The front end 108 of the A-clip may be designed to fit the ends of the insertion tool 150 as shown in FIG. 6.

The gradual attenuation process may begin by inserting the polymer into the A-clip (Step 200). The polymer 102 may be inserted into the polymer holder 138 using the polymer notches 126. The polymer notch 126A on the first inner arm 118 is pulled towards the first outer arm 116 and the polymer notch 126B on the second inner arm 130 is pulled towards the second outer arm 128 using any tool, such as a pliers or insertion tool 150 sufficient to pull the inner arms 118, 130 towards the outer arms 116, 128. The polymer 102 is placed in the polymer holder 138 and the polymer notches 126 are released. The inner arms 118, 130 moves inward until they reach the ends of the polymer 102. The inner arms 118, 130 may rest on the edges of the polymer 102 or they may push the polymer 102 inward. If the polymer is inserted during room temperature the A-clip is easily deformed and the inner arms 118, 130 moves towards the outer arms 116 and 128 respectively as shown in the figures.

Next, the A-clip is sterilized (Step 202). In order to avoid bacteria contamination which could be transferred to patients, sterilization and cleaning are important requirements for the A-clip 101 and biodegradable polymer 102. Descaling is a method to clean metal surface which can be done mechanically, chemically or by combination of both of the methods. Sterilization may also include radiation, ethylene oxide, steam, or dry heat. The polymer 102 and A-clip 101 may be sterilized together or separately prior to being inserted into the patient.

Next, the insertion tool is inserted into the A-clip and inserted into the patient (Step 204). The insertion tool 150 slides through the insertion opening 172 on both the first side 112 and the opposing second side 114. A ridge on the insertion tool 150 fits into the insertion notches 148 on the first outer arm 116 and the second outer arm 128. A lower temperature allows the A-clip 101 to be deformed from the closed position 136. The front end 108 of the A-clip 101/100 is opened wide enough to fit over the shunt 164. The insertion tool 150 may pull the A-clip 101 into the loading position 162 as shown in FIG. 8. The open front end 108 is placed on each side of the shunt 164. The insertion tool 150 slowly closes the front end 108 so the first proximal side 120 and the second proximal side 132 touch the shunt. The insertion tool 150 may simply be removed and the polymer 102 adjusts to the initial size of the tissue 164, shunt 164 or vessel 164 or tries to spring back to the closed position 136. The polymer 102 prevents the A-clip from quickly moving from the open position to the closed position. The insertion tool 150 is removed from the A-clip 101 and the surgery is finished. In some cases, the increase of the body temperature from room temperature may make the A-clip stiffer and move the first proximal side 120 and the second proximal side 132 towards the vessel and away from the outer arms 116, 128.

Next, overtime the polymer 102 degrades and the first inner arm 118 and the second inner arm 130 move closer to each other slowly closing the shunt 164, vessel 164 or tissue 164 (Step 206). The speed of the closure is dependent on the biodegradable polymer 102 that is chosen. The biodegradable polymer 102 is degraded using chemical bond scission or physical erosion when the polymer 102 is exposed to the body's biological environment. The chemical bond scission is initiated by hydrolysis such as passive hydrolysis or enzyme catalyzed hydrolysis. The type of hydrolysis may be dependent on the type of polymer 102 contained in the polymer holder 138. Anhydride, ortho-ester, urea, urethane/carbonate, and amide bonds may be degraded using passive hydrolytic degradation. The less hydrophilic the polymer 102 is the longer the polymer 102 takes to degrade. Additional properties of the polymer 102 may decrease the rate of degradation including the monomer building block, molecular weight, crystallinity, phase microstructure, material processing, and whether any acid byproducts are produced during degradation. The biodegradable polymer 102 may also undergo bulk erosion or surface erosion. In some cases, as the polymer degrades, the body temperature of the patient continues to hold the A-clip in the austenite phase and the inner arms 118 and 130 move towards each other slowly closing the shunt 164.

Lastly, the A-clip 101 closes or seals the shunt 164 (Step 208). Once the polymer 102 degrades enough to close a gap 178 between the first inner arm 118 and the second inner arm 130 the shunt 164 is closed 176. If the polymer holder 138 is offset 170 from the inner arms of the A-clip the polymer 102 may continue to degrade even after the shunt 164 is sealed 176. In some cases, the higher temperature of the body of the patient 180 makes the material of the A-clip 101 less flexible and hold the closed position 136 shape.

The invention is not to be limited to the particular embodiments described herein. In particular, the invention contemplates numerous variations in attenuation clips. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

What is claimed is:

1. An attenuation clip for gradual attenuation of a shunt, the attenuation clip comprising:
    a front end opposing a back end wherein the front end has a front opening configured to slide over a shunt;
    a first side having a first outer arm and a first inner arm and an opposing second side having a second outer arm and a second inner arm, wherein a proximal side of the first inner arm and a proximal side of the second inner arm are configured to rest on the shunt; and
    a polymer holding member connected to the first inner arm and the second inner arm, wherein the polymer holding member is configured to hold a polymer;
    wherein the front end, back end, first arm, second arm and polymer holding member are comprised of an elastic metal material.

2. The attenuation clip of claim 1 wherein the elastic metal material comprises a super elastic metal.

3. The attenuation clip of claim 1 wherein the memory metal is a two-way metal memory alloy having a deformable open position at a first temperature and a closed position at a second temperature.

4. The attenuation clip of claim 1 wherein the polymer is a biodegradable polymer.

5. The attenuation clip of claim 1 wherein a posterior side of the first inner arm further comprises a first polymer notch and wherein a posterior side of the second inner arm further comprises a second polymer notch.

6. The attenuation clip of claim 1 wherein the first outer arm further comprises a first insertion notch and wherein the second outer arm further comprises a second insertion notch.

7. An attenuation clip system for gradual attenuation of a shunt, the system comprising:
    an attenuation clip having a first side opposing a second side wherein the first side and second side are spaced apart by a back end, wherein the first side further comprises a first inner arm and a first outer arm and the second side further comprises a second inner arm and a second outer arm, wherein the first inner arm and the second inner arm are configured to rest on a shunt, the attenuation clip further comprising:
        a polymer holder having a first end on a back end of the first inner arm opposing a second end on a back of the second inner arm, wherein the polymer holder is configured to hold a biodegradable polymer;
at least one insertion notch configured to connect to an insertion tool while the attenuation clip is placed over a shunt;
wherein the first arm, second arm, back end and polymer holder are comprised of a super elastic metal, the super elastic metal is configured to deform a shape of the attenuation clip;
a biodegradable polymer resting in the polymer holder, wherein the biodegradable polymer is configured to degrade if the biodegradable polymer is inserted into a body of a patient;
wherein the polymer holder decreases in size as the biodegradable polymer degrades; and
wherein the first inner arm and second inner arm are configured to move towards each other at the second temperature as the biodegradable polymer degrades.

8. The attenuation clip system of claim 7 wherein the super elastic metal comprises nitinol.

9. The attenuation clip system of claim 7 wherein the attenuation clip is configured to be inserted into an animal.

10. The attenuation clip system of claim 7, wherein the attenuation clip is configured to close a shunt.

11. The attenuation clip of claim 7 wherein hydrolysis degrades the biodegradable polymer.

12. The attenuation clip of claim 7 wherein the polymer holder comprises a first offset between the first end of the polymer holder and a proximal side of the first inner arm and a second offset between the second end of the polymer holder and a proximal side of the second inner arm.

13. The attenuation clip of claim 7 wherein a proximal side of the first inner arm has one or more protrusions configured to rest on the shunt.

14. The attenuation clip of claim 13 wherein a proximal side of the second inner arm has one or more protrusions configured to rest on the shunt and wherein the one or more protrusions on the second arm alternate with the one or more protrusions on the first inner arm.

15. A method for the gradual attenuation of a shunt using an attenuation clip system, the method comprising:
inserting a polymer into a polymer holder of an attenuation clip comprising super elastic metal, wherein the super elastic metal is configured to be deformed to a loading position and then recover to a closed position;
inserting the attenuation clip using an insertion tool into a body of a patient wherein the attention clip is placed over the shunt and wherein the insertion tool spreads a first arm of the attenuation clip and a second arm of the attenuation clip into an open position to place the clip around the shunt, and wherein the insertion tool secures the first arm and the second arm around the shunt by removal the insertion tool;
degrading the polymer wherein the polymer holder decreases in size as the polymer degrades and wherein the first arm of the attenuation clip and the second arm of the attenuation clip move inward as the polymer degrades;
closing the shunt by the attenuation clip, wherein the first arm and the second arm of the attenuation clip press together.

16. The method of claim 15 further comprising:
sterilizing the attenuation clip prior to insertion into the body of the patient.

17. The method of claim 15 wherein the attenuation clip has at least one insertion notch for securing the insertion tool.

18. The method of claim 15 wherein a first temperature deforms the shape of the attenuation clip for inserting the polymer.

19. The method of claim 18 wherein a second temperature stiffens a memory metal of the attenuation clip securing the first arm of the attenuation clip and the second arm of the attenuation clip to the shunt.

20. The method of claim 15 wherein the super elastic metal is comprised of Nitinol.

* * * * *